T. R. WAY.
Measuring-Wheels.
No. 155,274. Patented Sept. 22, 1874.
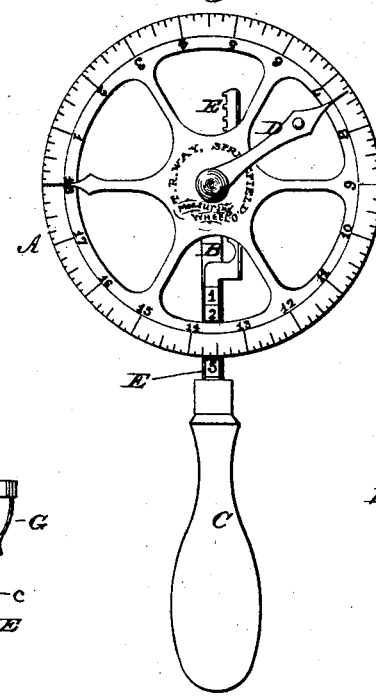
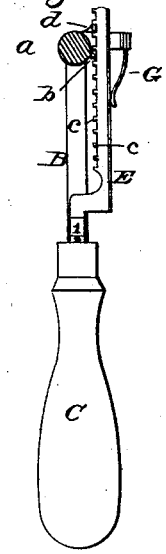
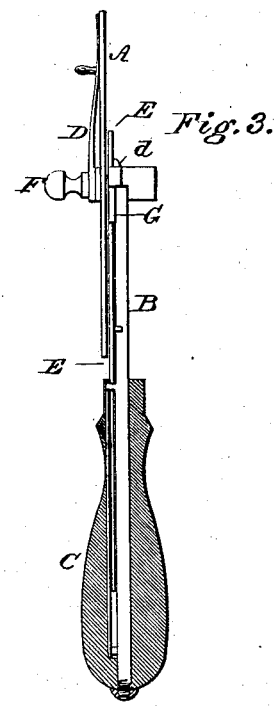
Witnesses:
H. H. Dodge
Wm. E. Chaffee
Inventor:
Thomas R. Way
By his attys.
Dodge & Son

UNITED STATES PATENT OFFICE.

THOMAS R. WAY, OF SPRINGFIELD, OHIO.

IMPROVEMENT IN MEASURING-WHEELS.

Specification forming part of Letters Patent No. 155,274, dated September 22, 1874; application filed March 3, 1874.

*To all whom it may concern:*

Be it known that I, THOMAS R. WAY, of Springfield, in the county of Clarke and State of Ohio, have invented certain Improvements in Measuring-Wheels or Travelers, used by wheelwrights, coopers, &c., of which the following is a specification:

My invention relates to a novel arrangement of devices for recording the number of entire revolutions made by the wheel proper. It consists in a graduated sliding bar, moved by a tooth on the hub of the wheel, and in a spring and stud arranged to lock said bar fast during the proper intervals.

Figure 1 is a face view of my improved instrument; Fig. 2, a face view of the same, with the wheel proper removed to expose the registering devices; and Fig. 3, an edge or side view of the same, with the handle in section.

A represents the wheel proper, made as usual, with a graduated face, and with a central hub or journal mounted in one end of a bar or arm, B, the opposite end of which latter is provided with the customary handle C. E represents the sliding index or register bar, one end of which extends up behind the hub of the wheel, while the other enters a socket made for the purpose in the handle C, by the side of the arm B, as shown in Figs. 2 and 3. The inner edge of the bar, next to the hub of the wheel, is provided with teeth $c$, and the hub of the wheel is provided with a single tooth, $b$, which at each revolution of the wheel engages with one of the teeth $c$, and slides the bar slightly outward. The bar is held up against the hub by a spring, G, bearing on its rear edge, said spring being secured to a projection on the arm or bar B, as shown in Figs. 2 and 3. The bar is held from moving, while out of contact with the tooth $b$, by means of a fixed stud, $d$, formed on the arm B, and locking between the teeth $c$, as shown in Fig. 2.

As the tooth $b$ on the wheel comes around against the bar E it first presses the same back sufficiently to unlock the teeth from the stud $d$, and then moves the bar outward, and again permits it to drop back and lock upon the stud $d$, which holds it fast until the next revolution of the wheel again brings the tooth around.

Thus it will be seen that, at each revolution of the wheel, the bar E is moved outward a distance equal to that from one tooth to the next. That portion of the bar which slides within the handle C is provided with graduations or marks, at the same distance apart as the teeth $c$, and numbered consecutively toward the inner end of the bar. As the bar is drawn out by the revolutions of the wheel the graduations and numbers are exposed one after another, and the number nearest the handle indicates the number of complete revolutions made by the wheel. The last fractional revolution, if any, is recorded by an adjustable hand on the face of the wheel, as usual.

The spring G serves not only to hold the bar in contact with the hub and the locking-stud, but also to admit of the bar being released and pushed back into the handle, and to prevent the parts from being strained or broken in case the wheel is turned in the wrong direction, or when the bar is drawn out to the proper limit.

It is obvious that the stud $d$ may be dispensed with, and the bar provided on its back with notches for the spring to engage in. The bar may be used without any locking device, and even without the spring.

Having described my invention, what I claim is—

1. In combination with the wheel A having the tooth $b$, and the arm B having the spring G, the sliding bar E provided with the teeth and the graduations, as shown and described.

2. In combination with the wheel A having the tooth $b$, and the sliding bar E having the teeth and the graduations, the arm B provided with the spring G and stud $d$, as shown.

3. In combination with the wheel A having the tooth $b$, the sliding bar E provided with the teeth and graduations, the arm B, and the hollow handle C, as shown and described.

THOMAS RIGHT WAY.

Witnesses:
A. P. LINN COCHRAN,
WILLIAM T. BEVITT.